United States Patent [19]

Solomovitz B.

[11] 4,037,067
[45] July 19, 1977

[54] ANTI-VANDALISM PROTECTIVE ATTACHMENT DEVICE FOR A PAY TELEPHONE

[76] Inventor: Yancu Solomovitz B., Casa Numero 61-17 1st Avenue, Caracas, Venezuela

[21] Appl. No.: 644,330

[22] Filed: Dec. 24, 1975

[51] Int. Cl.² .................... H04R 1/02; H04M 1/26
[52] U.S. Cl. ......................... 179/184; 179/90 FW
[58] Field of Search ............. 179/6.3 R, 90 FW, 178, 179/179, 184

[56] References Cited

U.S. PATENT DOCUMENTS

| 2,644,861 | 7/1953 | Jouban | 179/179 |
|---|---|---|---|
| 2,952,740 | 9/1960 | Montrose | 179/179 |

FOREIGN PATENT DOCUMENTS

| 707,767 | 4/1954 | United Kingdom | 179/179 |

*Primary Examiner*—George G. Stellar
*Attorney, Agent, or Firm*—Berman, Aisenberg & Platt

[57] ABSTRACT

A protective anti-vandalism device for a pay telephone. The device consists of an outer impact-resistant support member containing an annular raceway member having a reduced end portion engagable in the dial aperture of the telephone. A substitute disc-like dial is rotatably mounted in the raceway member by means of ball bearings between the periphery of the substitute dial and the raceway. The substitute dial has outwardly facing recesses circularly arranged and numbered to correspond with the dial numbers of the telephone and being registrable therewith when the support member is secured to the telephone around its dial aperture. A drive member is secured to the inside surface of the substitute dial in axial alignment with the zero recess and is engagable in the zero opening of the telephone dial rotary member. The annular support member has an inwardly projecting finger stop plug registrable with the finger stop plug of the telephone dial assembly when the support member is secured to the telephone around the dial aperture. Said support member is secured to the telephone by means of fastening screws passed through the wall of the telephone housing from the inside.

14 Claims, 8 Drawing Figures

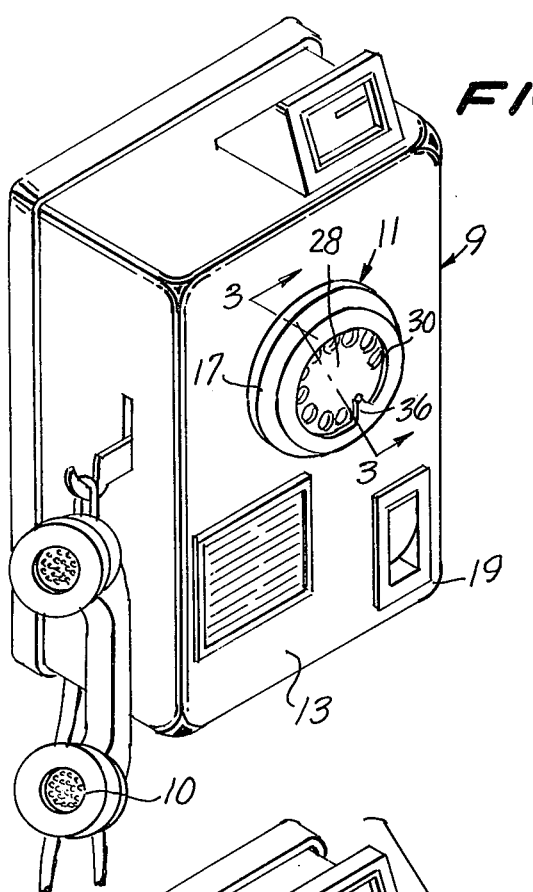
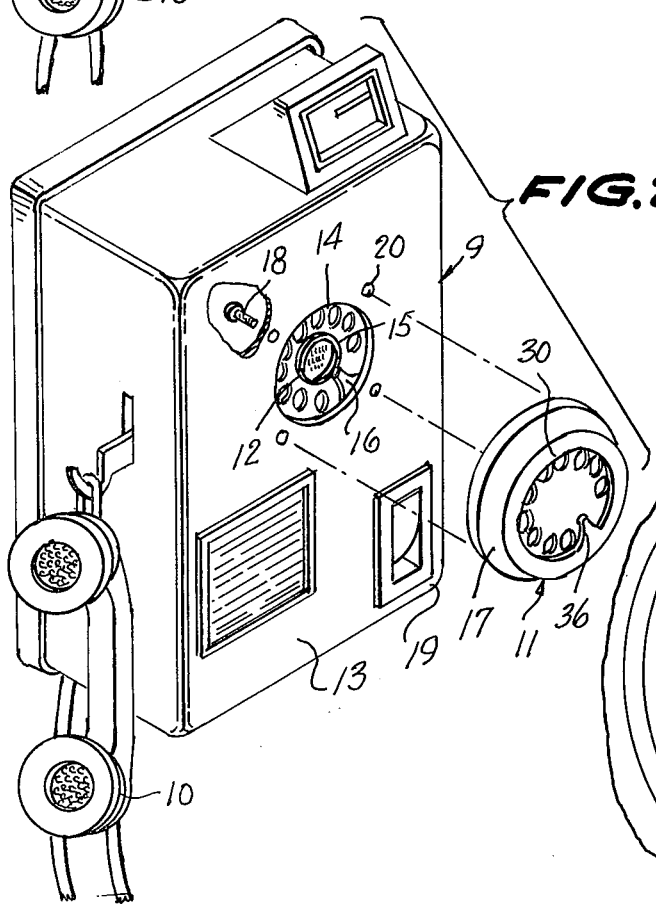
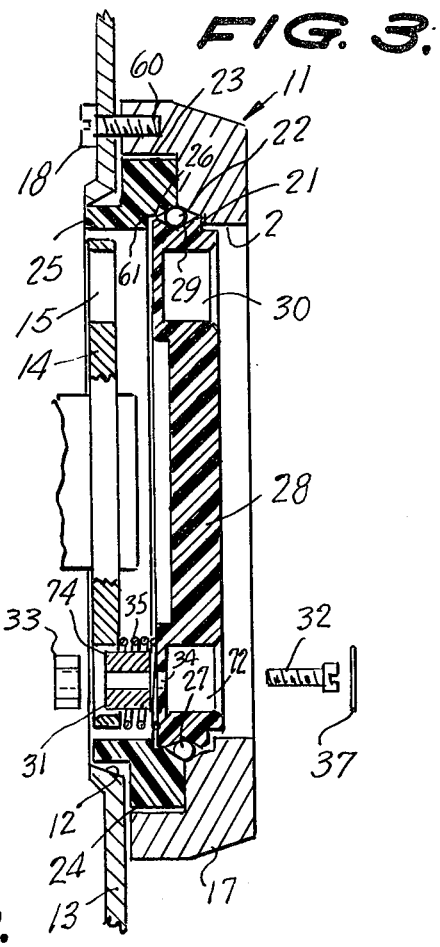
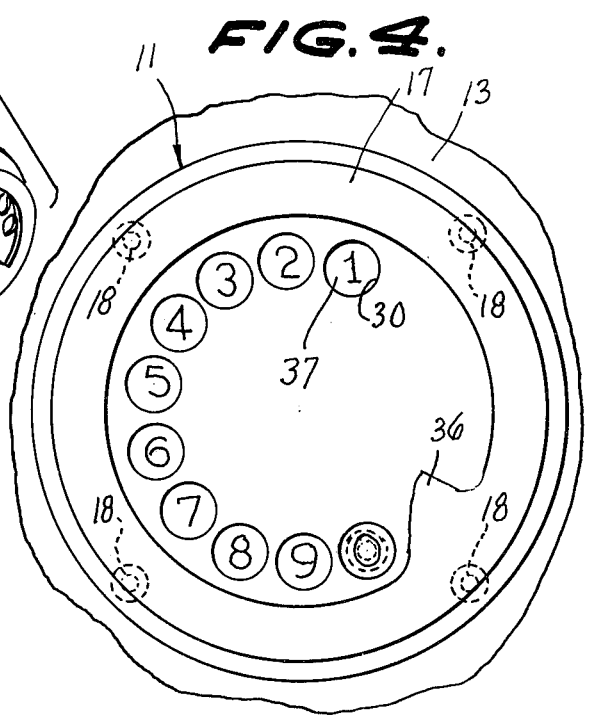

ANTI-VANDALISM PROTECTIVE ATTACHMENT DEVICE FOR A PAY TELEPHONE

This invention relates to anti-vandalism protective devices for pay telephones, amd more particularly to a protective device for the dialing mechanism of a pay telephone.

A main object of the invention is to provide a novel and improved device for the dial mechanism of a pay telephone, the device being simple in construction, being easy to install, and having rugged parts which are able to resist heavy impacts and which are arranged to completely shield the fragile dial mechanism of the telephone while allowing it to be operated in a normal manner.

A further object of the invention is to provide an improved anti-vandalism shield assembly for the dial mechanism of a pay telephone which allows the dial mechanism to be operated in a customary fashion, which adequately protects the dial mechanism from impacts imparted to the telephone by angry customers or by vandals, and which does not adversely affect either the operation or the appearance of the telephone.

A still further object of the invention is to provide an improved anti-vandalism shield assembly for the dial mechanism of a pay telephone, the shield assembly being capable of economical manufacture, being capable of being readily installed in the field as a complete unit without requiring special tools, being compact in size, and being attractive in appearance.

A still further object of the invention is to provide an improved pay telephone anti-vandalism shield assembly for protecting the dial mechanism of a pay telephone against damage by vandals, without interfering with its operation, the assembly being devised to protect the telephone dial mechanism from being dislodged or muiliated, to prevent any access to the dial mechanism itself, to prevent the dial assembly from being forced inwardly by heavy impacts whereby to prevent destruction or damage to internal components, and to minimize replacement costs for damage by vandals.

Further objects and advantages of the invention will become apparent from the following description and claims, and from the accompanying drawings wherein:

FIG. 1 is a perspective view of a typical pay telephone provided with an improved anti-vandalism shield device according to the present invention.

FIG. 2 is a perspective view, partly broken away, of the pay telephone of FIG. 1 with the anti-vandalism shield device separated therefrom prior to installation.

FIG. 3 is an enlarged cross-sectional view taken substantially on line 3—3 of FIG. 1, showing one form of the protective shield assembly according to the present invention, with the dial drive element thereof and associated fastening parts disassembled.

FIG. 4 is an enlarged front elevational view of the protective shield assembly of FIG. 1.

Figure 5:
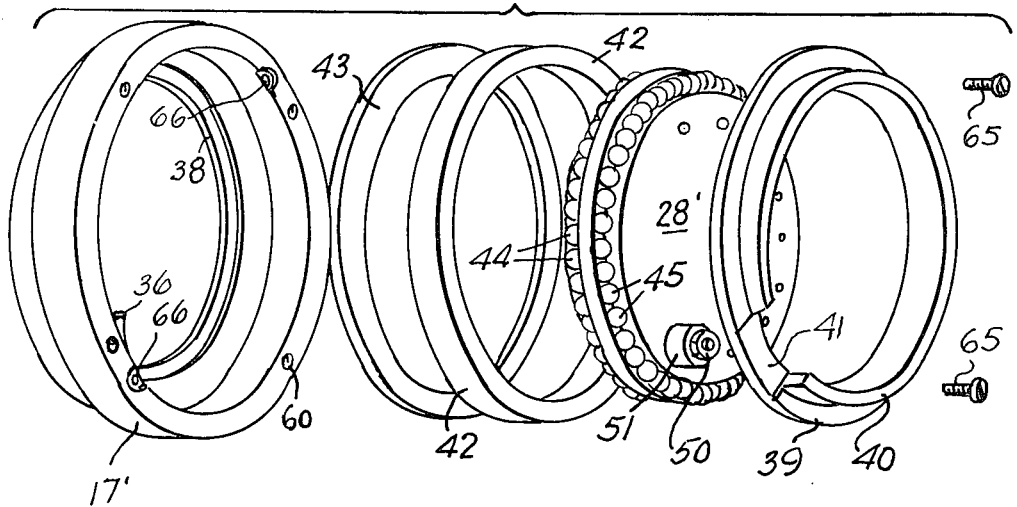
FIG. 5 is an exploded perspective view showing the components of another form of protective shield assembly according to the present invention.

The dialing assemblies of pay telephones have been particularly vulnerable to damage by vandalism, sometimes by angry and frustrated users because of bad service, or by malicious individuals. Angry users or malicious invididuals generally tend to employ the telephone receiver as a hammer or buldgeon and use it to strike the dial assembly, causing serious damage thereto and often driving the dial assembly inwardly, creating serious damage to or destruction of the delicate and expensive internal components of the telephone installation.

A prime purpose of the present invention is to provide an effective guard shield assembly which will protect the dial mechanism and shield it and the internal parts adjacent thereto from damage or destruction by such hammer blows, as well as to prevent any access to the dial mechanism by prying implements such as knife blades, screwdrivers, the receiver hang-up lug, or the like, without interferring with normal usage of the dial mechanism.

Referring to the drawings, and more particularly to FIGS. 1 through 4, a conventional pay telephone is illustrated generally at 9, the telephone being provided with a hook-supported hand set or receiver 10. FIG. 1 shows a protective shiled assembly 11 according to the present invention installed over the circular dial aperture 12 in the front wall 13 (see FIG. 2) to which the rotary dial member 14 is normally exposed. Dial member 14 has the circularly arranged finger holes 15 through which the dial numbers are normally visible. The dial assembly also includes an inwardly extending finger stop lug 16 for stopping clockwise rotation of member 14 when rotated by a finger in one of the holes 15. The shield assembly 11 shown in FIGS. 1 through 4 comprises a generally annular cover member, or main support member, 17 which is secured concentrically around aperture 12 by a plurality of fastening screws 18, engaged from the inside of the telephone housing 19 through apertures 20 in the front walls 13 of the housing, spaced around dial aperture 12, as shown in FIG. 2, and engaged in tapped holes 60 in member 17. The outer surface of cover or support member 17 is smoothly contoured with no projection or protuberances. The member 17 is formed with a front flange 21 to define a generally circular front opening 22 and is recessed inwardly therefrom to define a frusto-conical annular bearing surface 22. Member 17 is annularly recessed at 23 to receive an annular raceway member 24 having a reduced generally annular inner end portion 25 which is receivable in the dial aperture 12 around member 14. The end portion 25 is suitably notched to receive finger lug 16.

Raceway member 24 is formed opposite bearing surface 22 with a cooperating frusto-conical bearing surface 26, forming a V-shaped annular outer groove for bearing balls 27. A disc-like substitute dial member 28 is rotatably received in the center plane of said V-shaped groove and has a corresponding outwardly facing peripheral V-shaped groove 29 forming the inner raceway seat for the balls 27. Member 28 is retained between flange 21 and the shouldered portion 61 of member 24 adjacent bearing surface 26, as shown in FIG. 3.

Member 28 is formed with circularly arranged forwardly facing finger-engagable recesses 30 located to register with the dial holes 15 of member 14.

A rearwardly directed drive sleeve member 31 is secured by a bolt 32 and nut 33 to the rear surface of member 28 in axial alignment with the zero recess 72. As shown in FIG. 3, the inner end wall of this zero recess 72 is formed with a central hole 34 to receive the bolt 32, and the drive sleeve 31 is engaged on bolt 32, being clamped thereto by nut 33. Sleeve 31 projcts rearwardly sufficiently to engage in the zero hole 74 of dial member 14. Thus, sleeve 31 provides a driving connection between substitute dial 28 and original dial member 14 when the device 11 is secured on the telephone 9 in the manner shown in FIG. 1. A coil spring 35 surrounds sleeve 31 and bears between member 14 and member 28.

Support member 17 is formed with an inwardly extending finger stop plug 36 (see FIG. 4), which is in registry with lug 16 when device 11 is intalled on the telephone 9. Stop lug 36 acts in the same manner as lug 16 to limit rotation of said substitute dial 28.

The recess 30 are provided with number-bearing indicia discs 37 suitably secured in the recesses to numerically identify the number recesses 30.

With the device 11 secured on the front wall of the telephone housing 19 in the manner shown in FIG. 1, the substitute dial 28 is employed in the same manner as original dial element 14, using the recesses 30 for finger engagement. The return spring means of the telephone dial mechanism returns the substitute dial to starting position when the recesses 30 are released.

Figures 6, 7, 8:
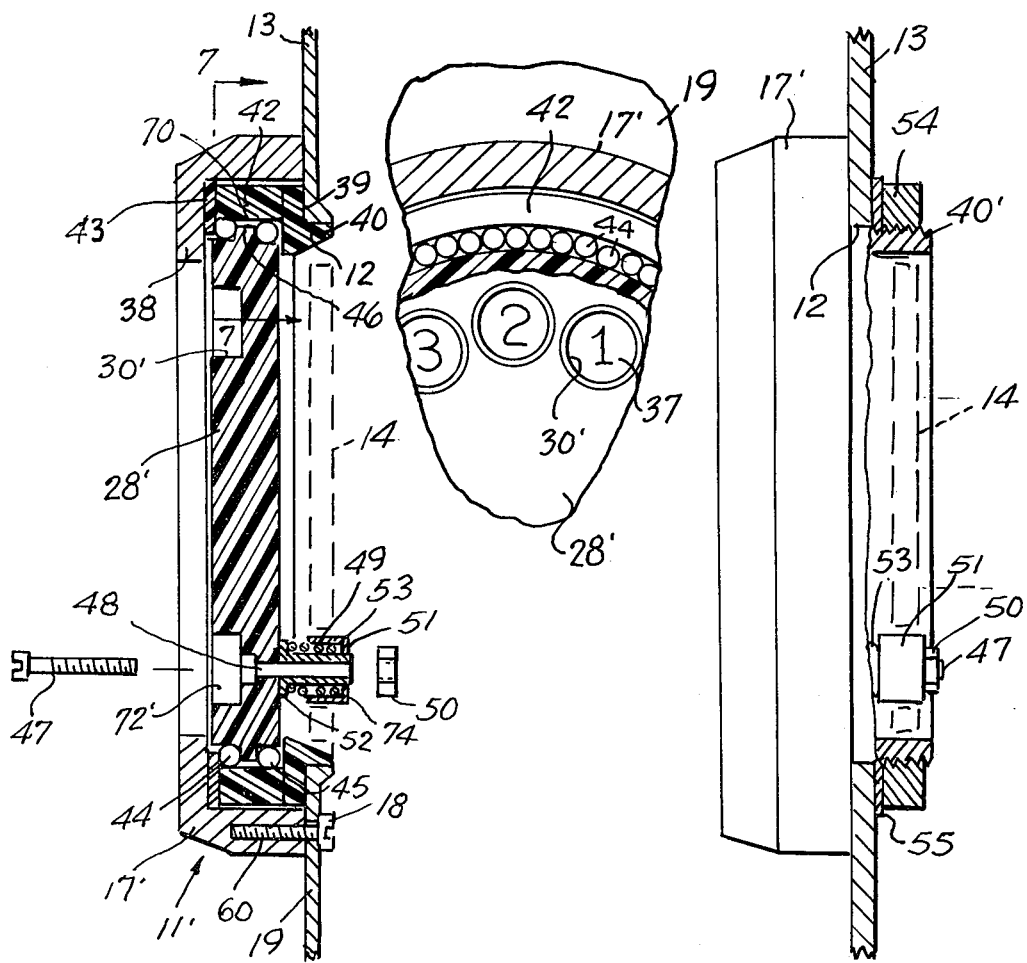
FIG. 6 is a cross-sectional view similar to FIG. 3 but showing the assembled protective shield assembly of FIG. 5.
FIG. 7 is a fragmentary vertical cross-sectional view taken substantially on line 7—7 of FIG. 6.
FIG. 8 is a vertical cross-sectional view generally similar to FIGS. 3 and 6, but showing another modification of a pay telephone dial protective shield assembly in accordance with the present invention.

FIGS. 5, 6 and 7 shows another form of the present invention, wherein the protective shield device is designated generally at 11'. The shield device 11' comprises a generally annular cover member, or main support member, 17', similar to the previously-described member 17, which is secured concentrically around the dial aperture 12 by a plurality of fastening screws 18, as in the previously-described form of the invention. Member 17' has the front flange 38 formed with the inwardly projecting finger stop lug 36. Received in the member 17' is an annular raceway assembly comprising an annular inner member 39, a main ring-like body 42 and a flat inwardly projecting retention ring 43 which are rigidly secured together in any suitable manner. The reduced inner end portion 40 of the ring 39 is engagable in the dial aperture 12 around dial member 14, and has a notch 41 to receive the finger stop lug 16. The raceway assembly has an inwardly facing channel 70, in the opposite corners of which are received respective sets of circularly arranged bearing balls 44 and 45 disposed on opposite sides of a peripheral divider rib 46 on the substitute dial member, shown at 28', which is thus rotatably and coaxially mounted in the main support member 17', being retained therein at its front side by flange 38 and at its rear side by the member 39.

Subistitute dial 28' has the circularly arranged number recesses 30', registrable with the number holes of dial member 14 when device 11' is installed on the telephone housing 19, the stop lugs 36 being then in registration with the normal finger stop lug 16. A drive assembly is secured to the rear surface of substitute dial 28' in axial alignment with the zero number recess 72' and is drivingly engageable with the zero hole 74 of the dial member 14 of the original dial assembly. The drive assembly comprises a flanged sleeve 49 mounted on a connecting bolt 47 extending through a conterbored axial hole 48 in the end wall of said zero recess 72', and clampingly held by a nut 50 threaded on the rear end of the bolt. An annular cap 51 is loosely mounted on sleeve 49, facing the flange 52 of the sleeve. A coiled spring 53 surrounds sleeve 49, bearing between flange 52 and cap member 51 and is received in said cap member, as shown in FIG. 6. Nut member 50 retains cap member 51 on sleeve 49. Howver, the loose fit of cap member 51 on the sleeve allows sufficient movement to facilitate the engagement of cap member 51 in the zero hole 74 of dial member 14 installing the device, and to enable the cap member 51 to be automatically adjusted to properly fit the zero hole 74, if there is any mis-alignment between the substitute dial 28' and the dial member 14.

The assembly of the parts shown in FIGS. 5, 6 and 7 is held together as a unit by headed retention screws 65,65 (FIG. 5) engaged in diametricaly opposed tapped countersunk holes 66, 66 provided in the rim of member 17', with the heads of the screws retentively overlying the member 39.

The device 11' is preassembled at the factory as a complete unit which can be easily handled in the field and which can be quickly and easily installed on existing public pay telephones, merely requiring the drilling of holes 20 in the front wall 13 of the telephone housing 19 for receiving the fastening screws 18.

FIG. 8 illustrates another embodiment of the invention, wherein the reduced inner end member 40' of the raceway assembly is extended and externally threaded to receive a clamping ring 54 which is threadedly engaged thereon. Ring 54 exerts clamping pressure on a washer 55 interposed between the ring and the adjacent front wall 13 of housing 19, and thereby clamps the raceway in the dial aperture 12.

While certain specific embodiments of protective anti-vandalism shield devices for the rotary dial assemblies of pay telephones have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A protetive device for the rotary dial assembly of a pay telephone of the type having a generally circular dial aperture provided with an inwardly projecting finger stop lug and a rotary dial having number holes at the same radial distance as said finger stop lug, the rotary dial being exposed through the circular aperture, said protective device comprising a generally annular support member shaped to engage on a pay telphone around the dial aperture substantially in concentric relation therewith, a substantially disc-like substitute dial rotatably and coaxially mounted in said annular support member, said substitute dial having circularly arranged recesses in its front face located to register with the number holes, a rearwardly projecting drive element, means supportingly connecting said drive element to the rear surface of said substitute dial at one of said recesses so that said rearwardly projecting drive element is drivingly engageable in a number hole when the support member is engaged on the telephone around the rotary dial aperture, finger stop means on the support member located to register with the finger stop lug of the rotary dial assembly, and means to secure the support member to the telephone in said substantially concentric relation with the dial aperture.

2. The protective device of claim 1, and anti-friction bearing means between the periphery of said substitute dial and said annular support member.

3. The protective device of claim 2, and wherein an annular raceway member is provided between the support member and said substitute dial, and said anti-friction bearing means comprises a plurality of rotary bearing elements disposed between the raceway member and the periphery of said substitute dial.

4. The protective device of claim 3, and means defining an annular recess between said raceway member and said substitute dial, said rotary bearing elements comprising bearing balls retentively received in said annular recess.

5. The protective device of claim 3, and wherein said annular raceway member is provided with a reduced annular end portion receivable in the dial aperture of the telephone.

6. The protective device of claim 3, and wherein said drive element has a yieldably-mounted cap member engageable in said number hole.

7. The protective device of claim 1, and wherein the means supportingly connecting said drive element to the substitute dial comprises rearwardly extending bolt means engaged through the substitute dial at said one of the recesses and a flanged sleeve element secured on said bolt means at the rear side of the substitute dial, and wherein said drive element comprises an annular cap member loosely mounted on the sleeve element, and spring means bearing between the flange of the sleeve element and the cap member and being received in the cap member.

8. The protective device of claim 1 and wherein the circularly arranged recesses are provided with the number indicia corresponding to the numbers exposed through the number holes of the rotary dial.

9. The protective device of claim 1 and wherein an annular raceway member is provided between the support member and the substitute dial, the raceway member and the periphery of the substitute dial being shaped to define an annular recess therebetween, and a plurality of rotary anti-friction bearing elements disposed in said annular recess.

10. The protective device of claim 9, and wherein said drive element comprises a sleeve member having a flange engaging the rear surface of the substitute dial adjacent said one of the recesses, an annular cap member loosely mounted on the sleeve member and facing the flange, and a coiled spring surrounding the sleeve member and bearing between the cap member and the flange, and wherein said means supportingly connecting the drive element to the substitute dial comprises a bolt extending through the substitute dial and through the sleeve member and provided with a nut on its rear end clampingly engaging the rear ends of the sleeve member.

11. An anti-vandalism protective device for a telephone comprising a cover member adapted to be attached to a telephone over its dial said cover member having a front opening, a disc shaped substitute dial rotatably mounted on said cover member in a position to be exposed through and protectively bridging said front opening and to be substantially parallel to the telephone dial when the cover member is attached to the telephone, and a drive element mounted on and projecting rearwardly from the substitute dial and being engageable in a number hole of the telephone dial when the cover member is attached to the telephone.

12. The anti-vandalism protective device of claim 11, and wherein said substitute dial has numbered finger recesses corresponding to and being rotated so as to be registrable with the number holes of the telephone dial.

13. The anti-vandalism protective device of claim 12, and a finger stop lug on the cover member projecting inwardly over the substitute dial and registering with the finger stop lug of the telephone dial when the cover member is attached to the telephone.

14. The anti-vandalism protective device of claim 12, and wherein said drive element is connected to the substitute dial at a position aligned with the finger recesses registrable with the zero number hole of the telephone dial.

* * * * *